Patented Oct. 1, 1935

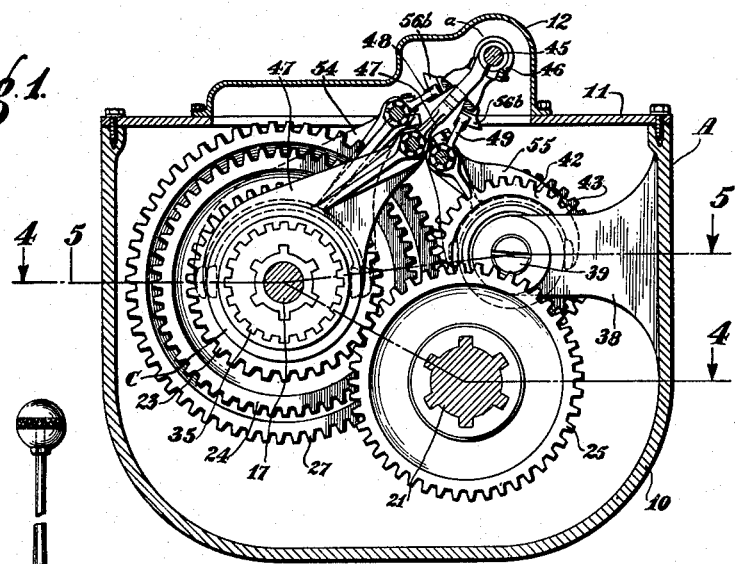

2,015,736

UNITED STATES PATENT OFFICE 2,015,736

CHANGE SPEED MECHANISM

Francis M. Vandervoort, Cleveland, Ohio, assignor to The White Motor Company, Cleveland, Ohio, a corporation of Ohio Application December 19, 1933, Serial No. 703,076

2 Claims. (Cl. 74—333)

This invention relates to change speed mechanisms, and more particularly to change speed mechanisms for automotive vehicles.

The principal object of this invention is to produce a simple and efficient change speed mechanism having two reverse speeds.

The invention will be readily understood from the description of one particular embodiment thereof illustrated in the accompanying drawings, in which:

Figure 1 is a sectional view of a change speed gear box for automotive vehicles, the section being taken on line 1—1 of Figure 2.

Figure 2 consists of a side elevation of the gear box shown in Figure 1 with a part of the casing broken away, and of a sectional view of the shifting mechanism used in connection with the gear box.

Figure 3 is a detail view of a swinging member mounted in the upper part of the gear box.

Figure 4:
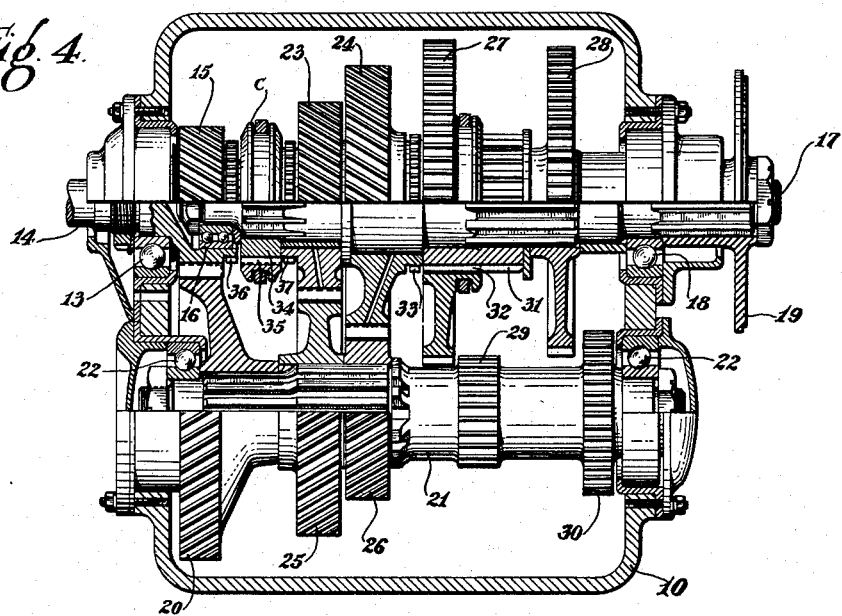
Figure 4 is a sectional view of the gear box taken on line 4—4 of Figure 1.
Figure 5:
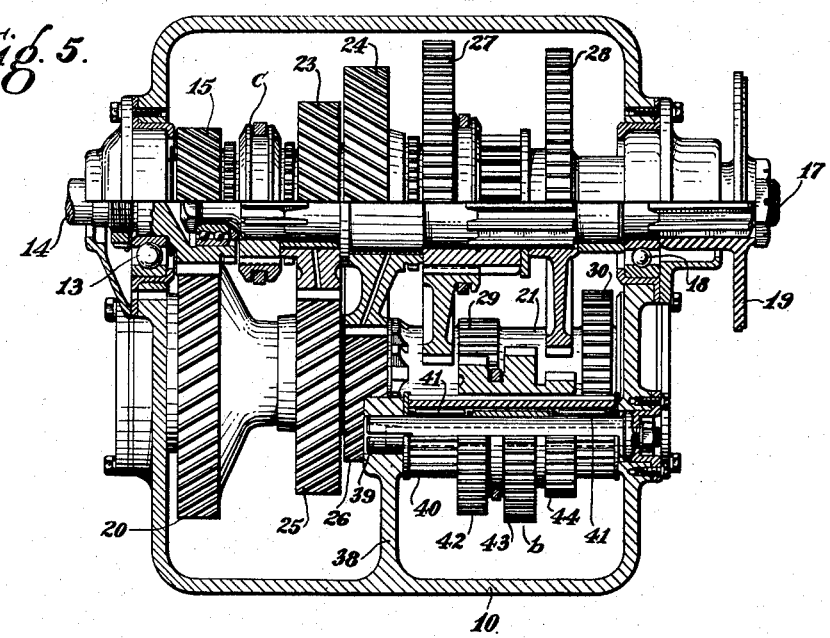
Figure 5 is a sectional view of the gear box taken on line 5—5 of Figure 1.

Referring to the drawings, the speed change mechanism therein illustrated comprises two units, a gear box A and a shifting mechanism B. The gear box A is constructed with a housing consisting of a main casing 10, a slotted cover 11 for the casing 10, and an auxiliary casing 12 which encloses the upper part of a shifting mechansm "a". Extending into the forward end of the casing 10 and supported by a ball bearing 13, there is a driving shaft 14 which when the gear box is installed in a motor vehicle is driven in a conventional manner by the engine of the vehicle. The inner end of the shaft 14 is formed with an integral gear 15 which is axially bored to provide a seat for the bearing 16 which supports the forward end of an aligned driven shaft 17. The shaft 17 is supported at its rear end by a ball bearing 18 mounted in an aperture formed in the rear wall of the casing 10. Secured upon the rear end of the shaft 17 there is a flanged member 19 through which the shaft 17 is connected with the driving mechanism of the vehicle upon which the gear box is installed. The gear 15 meshes with a gear 20 rigidly affixed upon a countershaft 21 mounted at one side of the driven shaft 17 and supported in ball bearings 22 mounted in the end walls of the casing 10. The driven shaft 17 supports two rotatably mounted constantly driven gears 23 and 24 which mesh with two gears 25 and 26 rigidly affixed upon the countershaft 21. The driven shaft 17 in addition supports a non-rotatably mounted slidably associated gear 27 and a rigidly affixed gear 28, and the countershaft 21 in addition to the gears recited supports two rigidly associated gears 29 and 30.

The gear 27 is mounted upon the shaft 17 through the instrumentality of a splined sleeve 31, and is so arranged and constructed that it can be moved from the neutral position shown either into mesh with the gear 29 and the forward gear of a gear set "b" hereafter described, or into a position with its internal splines 32 engaging with teeth 33 on the gear 24. Splined upon a sleeve 34 rigidly secured upon the forward end of the shaft 17, there is a clutch member "c" which can be moved from the position illustrated to a position with its inner splined teeth 35 engaging with teeth 36 on gear 15, or to a position with the splined teeth 35 engaging with teeth 37 on the gear 23.

Mounted at one side of the countershaft and supported in the rear wall of the casing 10 and an intermediate web 38, there is a pin 39 which supports the gear set "b". The gear set "b" is mounted upon the pin 39 through the instrumentality of a splined sleeve 40 journalled upon the pin by means of rollers 41, and consists of three integrally formed gears 42, 43, and 44. The gear set is so designed and arranged that it can be shifted from the neutral position shown into a position with the gear 42 meshing with the gear 27 and with the gear 43 meshing with the gear 29, or into a second position with the gear 43 meshing with the gear 28 and with the gear 44 meshing with the gear 30.

Assuming that in each instance the clutch member "c", the gear 27 and the gear set "b" occupies the position shown, four forward speeds and two reverse speeds are obtained as follows:

First speed, by shifting the gear 27 in a rearward direction to bring its teeth into mesh with the gear 29 on the countershaft and the gear 42 of the gear set "b", the resulting drive being through gears 15, 20, 29 and 27 with the gear set "b" running idle.

Second speed, by shifting the gear 27 in a forward direction to bring its splined teeth 32 into engagement with the teeth 33 on the gear 24, the resulting drive being through gears 15, 20, 26, and 24.

Third speed, by shifting the clutch member "c" in a rearward direction to bring its teeth 35 into engagement with the teeth 37 on the gear 23, the resulting drive being through gears 15, 20, 25, and 23.

Fourth speed, for direct drive by shifting the clutch member "c" in a forward direction to bring its teeth 35 into engagement with the teeth 36 on the gear 15.

Low speed reverse, by shifting the gear set "b" in a forward direction to bring the gear 42 into mesh with the gear 27 on the driven shaft and the gear 43 into mesh with the gear 29 on the countershaft, the resulting drive being through gears 15, 20, 29, 43, 42, and 27, and High speed reverse, by shifting the gear set "b" in a rearward direction to bring the gear 43 into engagement with the gear 28 on the driven shaft and the gear 44 into engagement with the gear 30 on the countershaft, the resulting drive being through gears 15, 20, 30, 44, 43, and 28.

The shifting mechanism "a" associated with the gear box comprises a shaft 45 mounted for longitudinal movement and rotatable oscillation within the casing 12. Secured upon the shaft 45, there is a finger 46, the free end of which is formed for engagement between the bifurcated upper ends of a fork 47 and members 48 and 49 mounted respectively on shifter rods 50, 51 and 52 supported in bearing members 53 mounted in the end walls of the casing 10. The shifter rod 50 is connected to the clutch "c" by means of the fork 47, and the shifter rods 51 and 52 to the gear 27 and the gear set "b" by means of forks 54 and 55. Rotatably mounted within the casing 10 in concentric relation to the shaft 45, there is a cradle 56 formed with a slot 56a which receives the finger 46 and with lugs 56b designed for engagement between the bifurcated upper ends of the members 48 and 49 and the fork 47. This cradle turns with the finger 46 and through the instrumentality of the lugs 56b acts to lock the shifter rod in neutral position except when operatively connected to the finger 46.

The shifting mechanism B comprises a casing 57, a shaft 58 which is connected to the shaft 45 associated with the gear box, and a shifting lever 59. The shaft 58 is formed with a crank portion 58a and is slidably and rotatably mounted in bearings 60 and 61 in the front and rear walls of the casing 57. The shifting lever 59 is mounted for universal movement in a cover 62 secured to the top of the casing 57, and is formed at its lower end with a ball 59a which is engaged within a slot in the lower portion of the crank 58a of the shaft 58. Through this arrangement the lever 59 when moved longitudinally causes the shaft 58 and the coordinated shaft 45 to be shifted in a reverse direction, and when the lever 59 is moved transversely to be rotated in a corresponding direction.

In effecting a speed change the shafts 58 and 45 are rotated through transverse movement of the lever 59 moving the finger 46 out of engagement with the upper bifurcated end of one of the members 47, 48, or 49 into engagement with the end of another of such members. The lever 59 is then moved forwardly or rearwardly to effect the speed change desired with a resultant longitudinal movement of the shafts 58 and 45 and the finger 46 producing a longitudinal movement of the shifter rod connected to the finger and shifting the associated parts of the gear box. In accomplishing the first operation the cradle 56 is turned by the finger 46 to a position where one or the other of the lugs 56b or both of the lugs, depending upon the driving connection initiated, acts to lock in neutral positions the shifter rods retained in such positions.

It will be seen from an examination of the drawing that when the gear 27 is moved into engagement with the gear 29 on the countershaft and the gear 42 of the gear set "b" in obtaining low forward speed, the gear set "b" and clutch "c" will be locked in the positions shown by the lug 56b shown at the right in Figure 1. It will further be seen that when the gear set "b" is moved in a forward direction to obtain low speed reverse the gear 27 and the clutch "c" will be locked in the positions shown by the lug 56b shown at the left in Figure 1.

Although the foregoing description is necessarily of a detailed character, in order that the invention may be completely set forth, it is to be understood that the specific terminology is not intended to be restrictive or confining, and that various rearrangements of parts and structural details may be resorted to without departing from the scope and spirit of the invention as herein claimed.

What I claim is:

1. In a change speed mechanism, a pair of rotatable shafts, a gear slidably and non-rotatably mounted upon one of said shafts, a second gear having a different diameter than said first named gear fixed on the same shaft as said first gear in spaced relation thereto, a third gear fixed on the other of said shafts with which said first named gear is brought into mesh when it is moved toward said second gear, a fourth gear fixed on the same shaft as said third gear disposed on the opposite side of said second gear from said third gear, and a shiftable gear set mounted adjacent said shafts consisting of three rigidly connected gears, an end gear designed for meshing engagement with said first named gear, a central gear designed for meshing engagement with said second gear and said third gear, and an end gear designed for meshing engagement with said fourth gear, the arrangement and design of said gear set being such that when said first named gear occupies a neutral position out of mesh with said third gear said set can be moved to a position in which said central gear and said first named end gear will form a driving connection between said first named gear and said third gear, and further being such that said set can be moved to a second position in which said central gear and said second named end gear will form a driving connection between said second gear and said fourth gear.

2. In a change speed mechanism, a pair of rotatable shafts, a gear rotatably mounted on one of said shafts, a second gear rigidly fixed on the other of said shafts and meshing with said first named gear, a third gear having a different diameter than said first named gear slidably and non-rotatably mounted upon the same shaft as said first named gear in a position adjacent thereto, means for connecting said third gear to said first named gear for simultaneous rotation when said third gear is moved into a position closely adjacent said first named gear, a fourth gear rigidly fixed on the same shaft as said second gear with which said third gear is brought into mesh when it is moved to a position in spaced relation to said first gear, said third gear being so designed and coordinated with the other parts that it can occupy a neutral position intermediate the aforesaid recited position in which it is disconnected from said first named gear and out of mesh with said fourth gear, a fifth gear fixed on the same shaft as said first named gear located on the opposite side of said third gear from said first gear, a sixth gear fixed on the same shaft as said second gear located on the opposite side of said fourth gear from said second gear, and a shiftable gear set mounted adjacent said countershaft consisting of three rigidly connected gears, an end gear designed for meshing engagement with said third gear, a central gear designed for meshing engagement with said fourth gear and said fifth gear, and an end gear designed for meshing engagement with said sixth gear, the arrangement and design of said gear set being such that when said set is moved to a position with the central gear meshing with said fourth gear the first named end gear is moved to a position in meshing relation to the neutral position of said third gear, and when said gear set is moved to a position with the central gear meshing with said fifth gear the second named end gear is moved into mesh with said sixth gear, the arrangement and design of said gear set further being such that it can occupy a neutral position with the central gear located between said fourth gear and said sixth gear with the end gears out of mesh with said third gear and said sixth gear.

FRANCIS M. VANDERVOORT.